United States Patent
Hong et al.

(10) Patent No.: US 10,461,859 B2
(45) Date of Patent: *Oct. 29, 2019

(54) METHOD OF OUTPUTTING COLOR CODE FOR DATA COMMUNICATION TO DISPLAY SCREEN AND METHOD OF TRANSMITTING DATA USING COLOR CODE

(71) Applicant: RESEARCH & BUSINESS FOUNDATION SUNGKYUNKWAN UNIVERSITY, Suwon-si (KR)

(72) Inventors: Kwang-Seok Hong, Gwacheon-si (KR); Byung Hun Oh, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/031,037

(22) Filed: Jul. 10, 2018

(65) Prior Publication Data

US 2018/0316427 A1 Nov. 1, 2018

Related U.S. Application Data

(63) Continuation of application No. 15/219,625, filed on Jul. 26, 2016, now Pat. No. 10,027,411.

(30) Foreign Application Priority Data

Jul. 28, 2015 (KR) .................. 10-2015-0106438

(51) Int. Cl.
  *H04B 10/116* (2013.01)
(52) U.S. Cl.
  CPC .................. *H04B 10/116* (2013.01)

(58) Field of Classification Search
  CPC .................................................. H04B 10/116
  See application file for complete search history.

(56) References Cited

U.S. PATENT DOCUMENTS

| | | | |
|---|---|---|---|
| 7,020,327 B2 | 3/2006 | Tack-Don et al. | |
| 8,620,163 B1 | 12/2013 | Sleator | |
| 10,027,411 B2* | 7/2018 | Hong | H04B 10/116 |
| 2004/0200904 A1 | 10/2004 | Pinson | |
| 2005/0254714 A1* | 11/2005 | Anne | H04M 1/7253 |
| | | | 382/233 |

(Continued)

*Primary Examiner* — Leslie C Pascal
(74) *Attorney, Agent, or Firm* — NSIP Law

(57) ABSTRACT

A method of outputting color code for data communication to a display screen, the method includes determining a plurality of sections having a predetermined order of a display screen, mapping the plurality of sections to different binary numbers each having at least one-bit length, and outputting a predetermined color to consecutive sections including at least a first section among the plurality of sections in a direction of the predetermined order or a reverse direction of the predetermined order. The color output to the consecutive sections represents binary numbers in which '0' or '1' is added to a front or end of designated binary numbers in the direction of the predetermined order or the reverse direction of the predetermined order, the designated binary numbers mapped to a last section among the consecutive sections in the direction of the predetermined order or the reverse direction of the predetermined order.

20 Claims, 15 Drawing Sheets

(56) References Cited

U.S. PATENT DOCUMENTS

| | | |
|---|---|---|
| 2014/0056172 A1 | 2/2014 | Lee et al. |
| 2014/0205136 A1 | 7/2014 | Oshima et al. |
| 2015/0082034 A1 | 3/2015 | Cesnik |
| 2016/0226585 A1 | 8/2016 | Sibecas et al. |

* cited by examiner

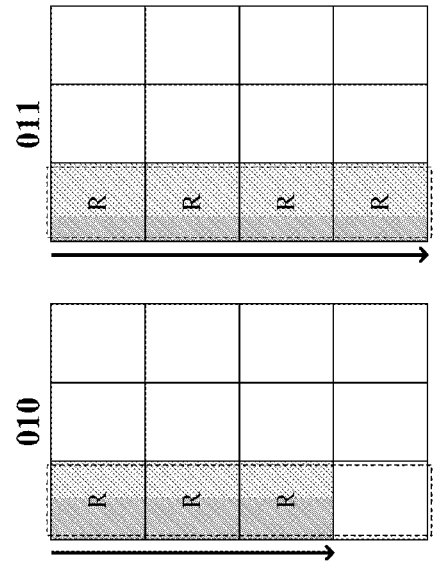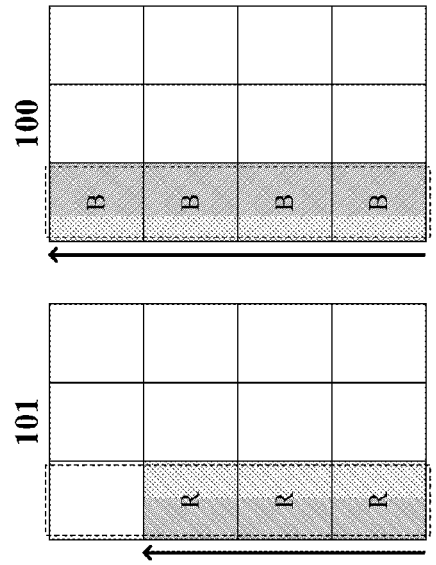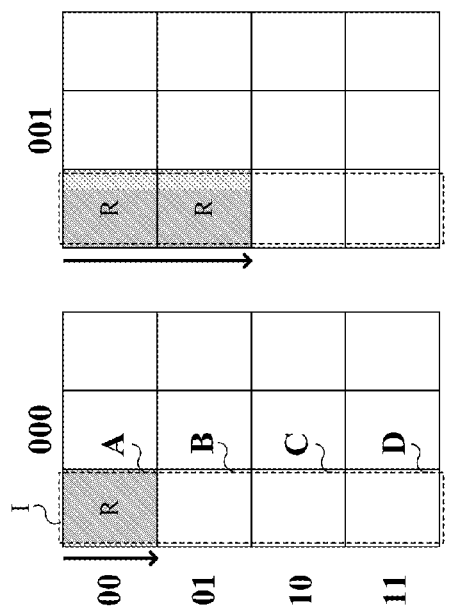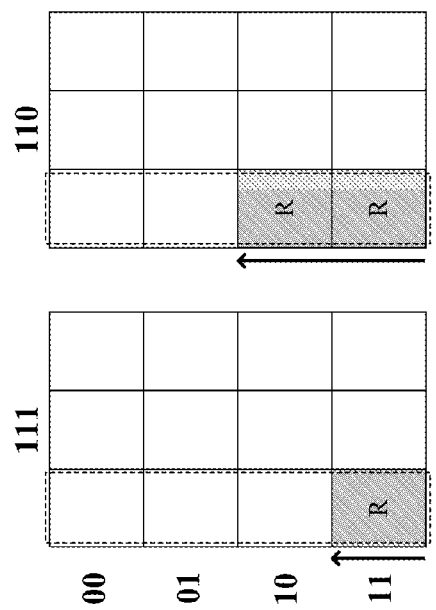

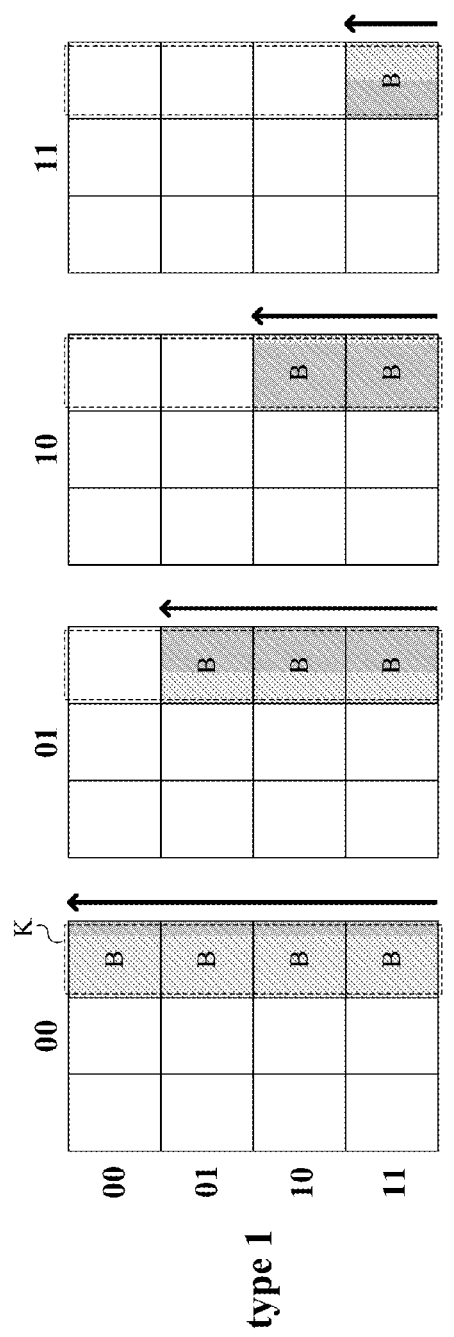
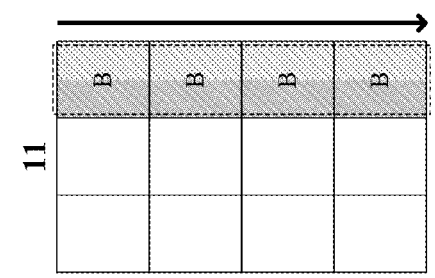
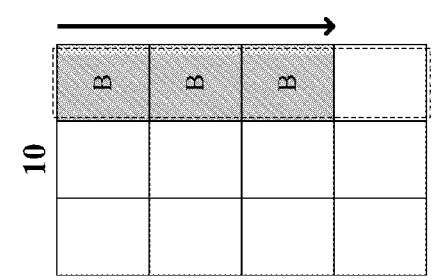
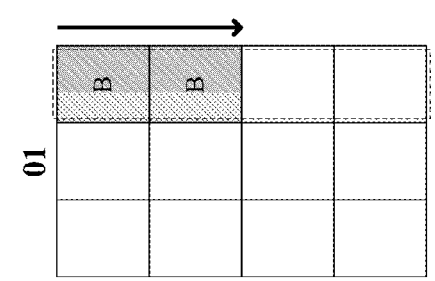
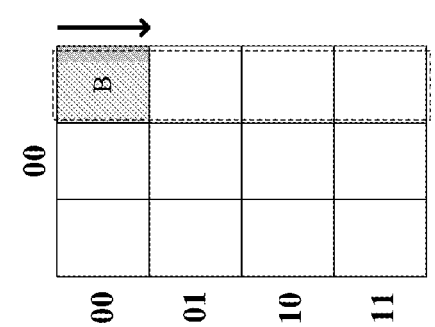
FIG.5A FIG.5B FIG.5C FIG.5D FIG.5E FIG.5F FIG.5G FIG.5H

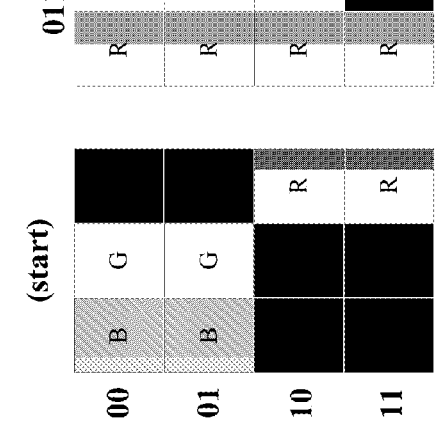
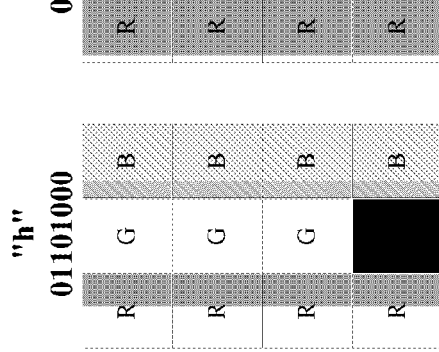
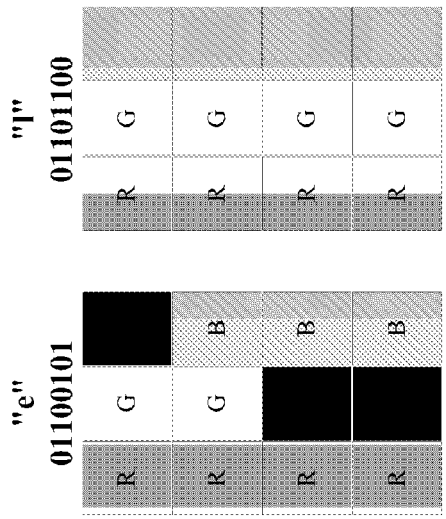
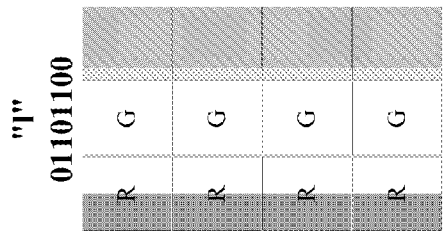
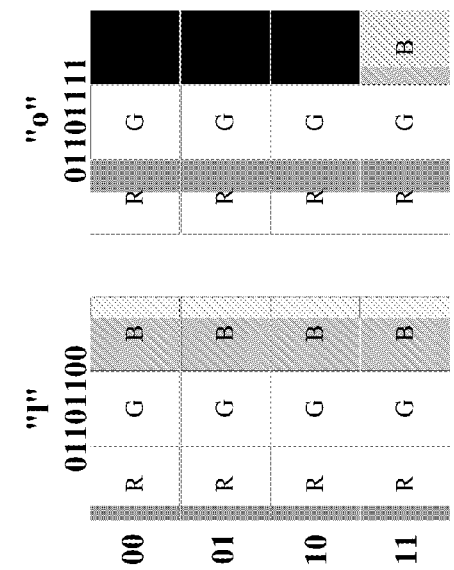
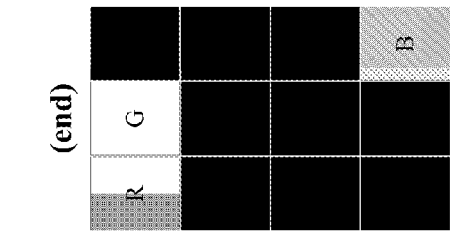
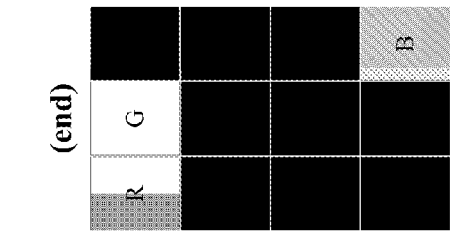

METHOD OF OUTPUTTING COLOR CODE FOR DATA COMMUNICATION TO DISPLAY SCREEN AND METHOD OF TRANSMITTING DATA USING COLOR CODE

CROSS-REFERENCE TO RELATED APPLICATION

This application is a continuation of U.S. application Ser. No. 15/219,625 filed on Jul. 26, 2016 which claims the benefit under 35 U.S.C. § 119A of Korean Patent Application No. 10-2015-0106438, filed on Jul. 28, 2015, in the Korean Intellectual Property Office, the entire disclosure of which is incorporated herein by reference for all purposes.

BACKGROUND

1. Field

The following description relates to data communication using color code on a display device.

2. Description of Related Art

Digital data has been generally transferred using a wireless communication method using a radio frequency (RF). Furthermore, various research has been conducted on methods which provide data transferring without an RF. As a representative example, there is a visible light communication method using a light-emitting diode (LED) device and a receiver.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of outputting color code for data communication to a display screen, the method includes determining a plurality of sections having a predetermined order of a display screen, mapping the plurality of sections to different binary numbers each having at least one-bit length, and outputting a predetermined color to consecutive sections including at least a first section among the plurality of sections in a direction of the predetermined order or a reverse direction of the predetermined order. The color output to the consecutive sections represents binary numbers in which '0' or '1' is added to a front or end of designated binary numbers in the direction of the predetermined order or the reverse direction of the predetermined order, the designated binary numbers mapped to a last section among the consecutive sections in the direction of the predetermined order or the reverse direction of the predetermined order.

The method may further include converting source data into binary code representing the source data, and the predetermined color may be output to the display screen so as to represent a portion of binary numbers based on the binary code.

A bit string of binary code corresponding to source data may be divided by a predetermined bit length, and the predetermined color may be output to the display screen so as to represent binary numbers included in the bit string in a unit of the certain bit length.

When the consecutive sections include all the plurality of sections, a color which may be different from the predetermined color may be output to the consecutive sections including all the plurality of sections in the direction of the predetermined order or the reverse direction of the predetermined order.

The predetermined color may be output to the consecutive sections in the direction of the predetermined order, and a color which may be different from the predetermined color is output to the consecutive sections in the reverse direction of the predetermined order.

The display screen may be divided into a plurality of code sections including the plurality of sections, and different colors are output to the plurality of code sections.

In another general aspect, a method of transferring data using color code, the method includes dividing a bit string of binary code corresponding to source data by a bit length, outputting a predetermined color to a plurality of sections having a predetermined order of a display screen, wherein the predetermined color corresponds to the bit string divided by the bit length, obtaining an image output to the display screen through a camera, and decoding the source data contained in the image on the basis of the predetermined color output to the plurality of sections. The transmitter outputs the predetermined color to consecutive sections including at least a first section among the plurality of sections in a direction of the predetermined order or a reverse direction of the predetermined order. The predetermined color output to the consecutive sections represents binary numbers in which '0' or '1' is added to a front or end of designated binary numbers in the direction of the predetermined direction order or the reverse direction of the predetermined order, the designated binary numbers mapped to a last section among the consecutive sections in the direction of the predetermined order or the reverse direction of the predetermined order.

When the consecutive sections include all the plurality of sections, the transmitter may output a color which may be different from the predetermined color to the consecutive sections including all the plurality of sections in the direction of the predetermined order or the reverse direction of the predetermined order.

The transmitter may output the predetermined color to the consecutive sections in the direction of the predetermined order, and may output a color which may be different from the predetermined color to the consecutive sections in the reverse direction of the predetermined order.

The transmitter may divide the display screen into a plurality of code sections respectively including the plurality of sections, and may output different colors to the plurality of code sections The method may further comprise decoding the source data and performing user authentication by comparing pre-stored authentication data with the decoded source data.

The method may further include preventing a color value from being output at intervals of frames or outputting a frame of black color while the predetermined color is output to the display screen.

The method may further include measuring an intensity of illumination, and control a brightness value or a color value of the predetermined color output to the consecutive sections when the measured intensity of illumination may be outside a reference range.

The method may further include a receiver measuring intensity of illumination or analyzing a brightness value of an image obtained by the camera, and transferring information regarding the intensity of illumination or the brightness value of the image to a transmitter through a network. When the intensity of illumination or the brightness value of the image is outside a reference range, the transmitter may control a brightness value or a color value of the predetermined color output to the consecutive sections.

A non-transitory computer-readable storage medium storing instructions that, when executed by a processor, may cause the processor to perform the method.

In another general aspect, a transmitter includes a processor configured to determine a plurality of sections having a predetermined order of a display screen, map the plurality of sections of the display to different binary numbers each having at least one-bit length, and output a predetermined color to consecutive sections including at least a first section among the plurality of sections in a direction of the predetermined order or a reverse direction of the predetermined order. The color output to the consecutive sections represents binary numbers in which '0' or '1' is added to a front or end of designated binary numbers in the direction of the predetermined order or the reverse direction of the predetermined order, the designated binary numbers mapped to a last section among the consecutive sections in the direction of the predetermined order or the reverse direction of the predetermined order.

The transmitter may be a smartphone, a tablet, a laptop or a computer.

In another general aspect, a receiver includes a camera, and a processor configured to receive an image from the camera, and decode the source data contained in the image on the basis of a predetermined color order of a plurality of sections of the image. The predetermined color order of consecutive sections represents binary numbers in which '0' or '1' is added to a front or end of designated binary numbers in a direction of the predetermined color order or a reverse direction of the predetermined color order, the designated binary numbers mapped to a last section among the consecutive sections in the direction of the predetermined color order or the reverse direction of the predetermined color order.

The transmitter may be a smartphone, a tablet, a laptop or a computer.

Other features and aspects will be apparent from the following detailed description, the drawings, and the claims.

BRIEF DESCRIPTION OF THE DRAWINGS

FIGS. 3A through 3H illustrate examples of a display screen on which color code is output according to an embodiment.

FIGS. 5A through 5H illustrate yet another examples of a display screen on which color code is output according to an embodiment.

FIGS. 6A through 6H illustrate example of a display screen on which binary code corresponding to text data is output using the color code according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.\.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

First, the terminology used herein will be described below.

A computer device recognizes various types of data in the form of a binary number. In the following description, data is transferred by outputting a specific color pattern corresponding to a binary number to a display device by a transmitter, and obtaining an image by a receiver using a camera. The transmitter outputs to the display device a color having a specific pattern corresponding to data to be transferred. The receiver decodes an image captured by the camera. Hereinafter, a color having a specific pattern and output from the transmitter is referred to as 'color code'.

The transmitter outputs color code corresponding to the data. The receiver distinguishes the color code from the captured image, and decodes the color code. Thus, the data is transferred from the transmitter to the receiver. The transmitter converts certain data into color code and outputs the color code to the display device. For example, the transmitter may be a computer device such as a personal computer (PC), a notebook computer, a smart phone, a tablet PC, or other device. The receiver may be a computer device such as a PC connected to a camera, a notebook computer including a camera therein, a smart phone, a tablet PC, or other device. Furthermore, the transmitter and the receiver may be dedicated devices configured to transfer data using color code.

Data to be converted into certain color code by the transmitter is referred to as 'source data'. The source data includes various types of data represented in the form of digital data. Examples of the source data include text data, image data, or audio data. For convenience of explanation, embodiments will be described with respect to text data among examples of the source data.

Figure 1:
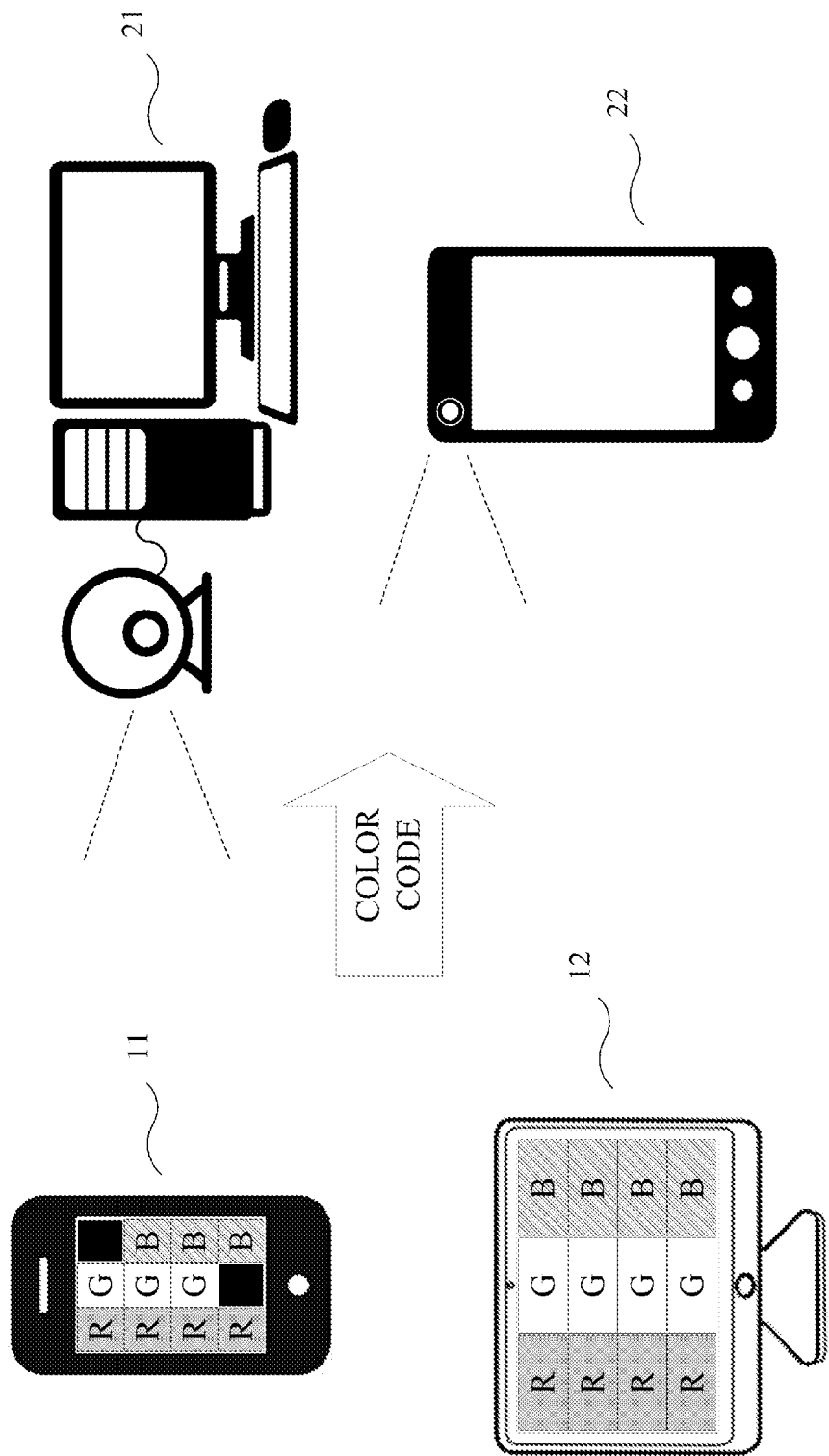
FIG. 1 is a diagram illustrating an example of a data transferring system using color code according to an embodiment.

FIG. 1 is a diagram illustrating an example of a data transferring system using color code. The system which transfers data using the color code includes a transmitter which outputs the color code, and a receiver which obtains, or receives, the color code output from the transmitter using a camera and decodes the color code. FIG. 1 illustrates a process of obtaining the color code output from the transmitter by the receiver using the camera.

FIG. 1 illustrates a portable terminal 11 and a monitor device 12 as examples of a transmitter. The transmitter outputs color code to a display screen thereof. The display screen outputs red (R), green G, and blue B colors having a specific pattern. A receiver spaced a distance from the transmitter obtains the color code output to the display screen of the transmitter using the camera. FIG. 1 illustrates a PC 21 connected to a camera and a portable terminal 22 including a camera therein as examples of the receiver.

Binary code representing source data and color code representing the binary code will be described below. In a computer device, data is represented using specific code. For example, text data is represented using code such as Unicode, or ASCII code. A bit string representing specific data in a computer device will be referred to as 'binary code'. The color code represents the binary code using a specific color pattern.

For example, in the ASCII code, text data 'hello' is represented using 01101000H, 01100101 E, 01101100(l), 01101100(l), and 01101111(o). The text data consists of one character. Each character is represented with eight bits.

The color code consists of a plurality of color code elements. The color code elements correspond to binary bits having a certain length. For example, the color code elements may represent a plurality of characters, one character (8 bits), double-digit binary bits, or a single-digit binary bit. A specific binary string or binary bits represented by each color code element are predetermined, or defined beforehand. For example, one color code element may correspond to '01101000H'. In this case, the number of color code elements needed to identify 8-bit binary bits may be $2^8(=256)$. One color code element may correspond to two-digit binary bits. In this case, the number of color code elements needed is $2^2(=4)$. In this case, four consecutive color code elements '01/10/10/00' may be needed to represent '01101000H' described above. Furthermore, one color code may correspond to various-digit binary bits.

The color code may be output to a specific section of the display screen. The color code may represent pieces of data (a binary string) which are different in an order in which colors are output to the specific section. Here, a color output to one specific section corresponds to one color code element. Thus, the whole color code is represented with a pattern of colors output to a plurality of sections of the display screen.

Some examples of a direction representing an order in which colors are output will be described below. According to an example, a direction from top to bottom is a forward direction when the plurality of sections are located vertically, a direction from bottom to top is a backward direction. According to an example, a direction from the left to the right is the forward direction when the plurality of sections are located horizontally, a direction from the right to the left is the backward direction. According to an example, the plurality of sections may include two or more columns or rows. In this case, the forward direction may be a direction from top to bottom in the same column or a direction from the left to the right in the same row. A reverse direction of the forward direction is the backward direction. According to an example, the plurality of sections may be located in discontinuous regions of the display screen. In this case, a predetermined order may be the forward direction.

FIGS. 2A-2D illustrates examples of a section of a display screen on which color code is output according to an embodiment. The color code is generated from a combination of a specific color output from the display screen and a shape, or pattern, in which the specific color is output. FIGS. 2A-2D illustrates examples of sections of the display screen from which the color code is output.

Figure 2A:
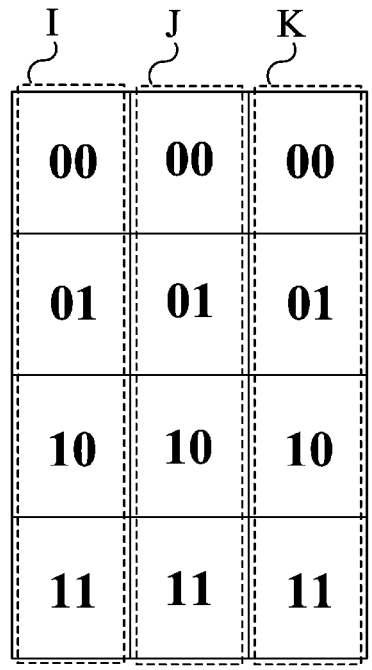
FIGS. 2A through 2D illustrate examples of a section of a display screen on which color code is output according to an embodiment.

FIG. 2A illustrates three columns I, J and K. These three columns each represent a string of two-digit binary bits in the same order. That is, FIG. 2A illustrates an example in which one color code element represents a string of two-digit bits. Referring to FIG. 2A, the three columns I, J and K are displayed in one screen and thus the screen may represent strings of six-digit bits.

A section representing one color code element, such as the three columns I, J and K of FIG. 2A, will be referred to as a 'code section'. Each code section includes a plurality of subsections according to the number of digits of a bit string represented by the code section. Referring to FIG. 2A, the three columns I, J and K are code sections each consisting of four subsections representing '00', '01', '10' and '11'. Binary bits (a bit string) represented by each of the four subsections are determined beforehand.

Information regarding code sections and subsections output to the display screen, binary numbers represented by the subsections, and the forward direction (or the backward direction) of each of the subsections should be shared beforehand between a transmitter and a receiver.

In FIG. 2A, when the transmitter outputs a specific color to an uppermost subsection of the code section I, the code section I represents bits '00'. In FIG. 2A, the three code sections represent 6-digit binary bits '00/01/11' when the transmitter outputs a color to the uppermost subsection of the code section I, a second subsection of the code section J from top to bottom, and a lowermost subsection of the code section K. Here, '/' is a mark used to distinguish the bit strings represented by these code sections from one another.

Figure 2B:
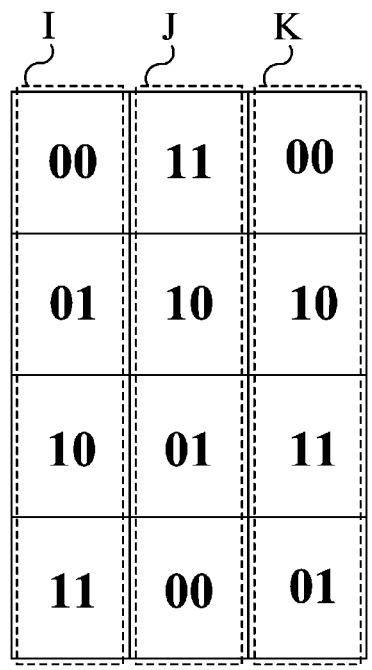

FIG. 2B illustrates that three columns respectively represent code sections each including four subsections representing two-digit binary bits, similar to FIG. 2A. Two-digit bits represented by subsections of a code section J and subsections of a code section K of FIG. 2B are different from those in FIG. 2A. Unlike the code section J of FIG. 2A, the subsections of the code section J of FIG. 2B represent 11→10→01→00 in a direction from top to bottom. The subsections of the code section K of FIG. 2B represent 00→10→11→01 in the direction from top to bottom.

Figure 2C:
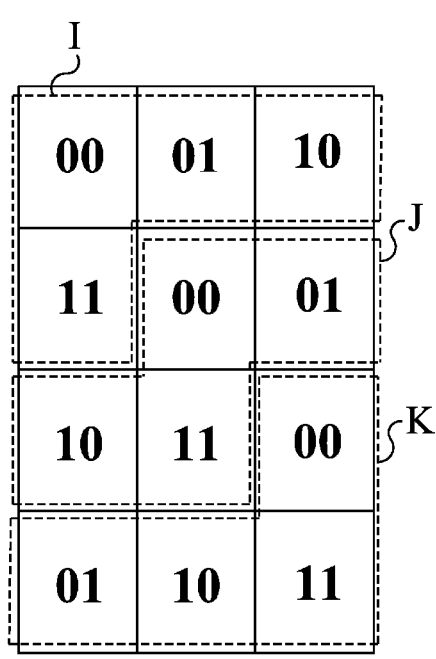

FIG. 2C illustrates three code sections I, J, and K which are not vertical columns. Referring to FIG. 2C, each of the code sections I, J and K includes four subsections sequentially representing 00→10→10→11 from left to right and continuing on the following row.

Figure 2D:
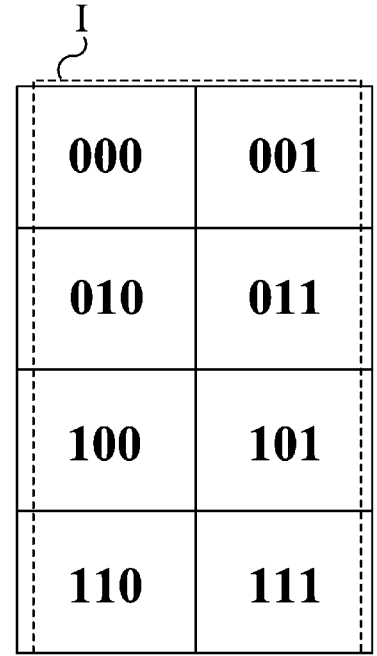

FIG. 2D illustrates one code section I on one screen. Each of subsections of the code section I of FIG. 2D represents three-digit binary bits. In the case of FIG. 2D, information corresponding to three-digit bits may be transferred to one screen.

FIGS. 2A-2D illustrate one example of a display screen, and embodiments are not limited thereto. The number and shape of code sections are variable. The number of subsections may vary according to the number of digits of binary bits represented by each of the code sections.

Several examples of color code will be described below. FIGS. 3A to 6H illustrate examples in which code sections and subsections such as those of FIG. 2A are used.

FIGS. 3A-3H illustrate examples of a display screen on which color code is output. FIGS. 3A-3H illustrate examples in which a specific color is output to the code section I of FIG. 2A. However, FIGS. 3A-3H illustrate three-digit bits other than two-digit bits by additionally using an order in which subsections are output as a criterion, unlike FIG. 2A. As described above, for convenience of explanation, it is assumed that a direction from top to bottom of a screen is the forward direction and a direction from bottom to top of the screen is the backward direction. In FIGS. 3A-3H, arrows represent an output direction.

FIG. 3A illustrates an example in which a red color (indicated by 'R') is output to a foremost subsection among four subsections in the forward direction. FIG. 3B illustrates an example in which the red color R is output to two subsections among the four subsections in the forward direction. FIG. 3C illustrates an example in which the red color R is output to three subsections among the four subsections in the forward direction. FIG. 3D illustrates an example in which the red color R is output to all the four subsections in the forward direction. In FIGS. 3A-3H, the outputting of the red color R is merely one embodiment and thus a different color may be output according to a rule defined beforehand by a user.

In FIG. 3A, subsections are sequentially indicated as A, B, C and D. A transmitter may output a color to the subsection A. When the transmitter outputs the color to the subsections B, C and D, the color is continuously output, starting from the subsection A. Thus, as illustrated in FIG. 3A to D, the color is output to the subsection A, the subsections A+B, the subsections A+B+C, and the subsections A+B+C+D. Sections to which a color is consecutively output as described above are referred to as 'consecutive sections'.

These subsections represents 00→01→10→11 which are two-digit bits in a direction from top to bottom. In the color code, one bit may deliver additional information according to a direction in which a color is output. The color code consists of binary bits represented by each of subsections and binary bits represented by the direction in which the color is output.

In code sections, a last subsection among consecutive sections to which a color is output represents specific binary bits. The specific binary bits represented by the last subsection of the consecutive sections will be referred to as 'reference binary bits'. For example, in FIG. 3A, reference binary bits of the subsection A are '00', reference binary bits of the subsection B are '01', reference binary bits of the subsection C are '10', and reference binary bits of the subsection D are '11'.

As described above, in color code, additional bit information is represented using a direction in which a color is output to consecutive sections as a criterion. Information added using this direction as a criterion will be referred to as 'additional bits'. For example, the forward direction may represent information indicating that '0' is added to the front of reference binary bits. The backward direction may represent information indicating that '1' is added to the front of the reference binary bits. Alternatively, the forward direction may represent information indicating that a bit '1' is added. Furthermore, additional bits may be inserted or added to a position on the reference binary bits other than the front thereof, according to information regarding an output direction. The position on the reference binary bits to which the additional bits are to be inserted or added is set beforehand. For example, the additional bits may be inserted into a middle of the reference binary bits or be added to the end of the reference binary bit. Furthermore, the additional bits may be binary bits consisting of a plurality of digits.

FIGS. 3A to 3D illustrate examples in which '0' is added to the front of reference binary bits when a color is output to consecutive sections in the forward direction. FIG. 3A illustrates '000'. FIG. 3B illustrates '001'. FIG. 3C illustrates '010'. FIG. 3D illustrates '011'. FIGS. 3E to 3H illustrate examples in which '1' is added to the front of the reference binary bits when a color is output to the consecutive sections in the backward direction. FIG. 3E illustrates '111'. FIG. 3F illustrates '110'. FIG. 3G illustrates '101'. Lastly, referring to FIG. 3H, blue color (indicated by 'B') is output rather than red color R, so that a direction may be identified when a color is output to all subsections. FIG. 3H illustrates a case in which a color is output to all sections in the backward direction, and illustrates '100'.

Figure 4D:
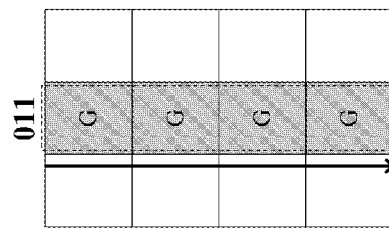
FIGS. 4A through 4H illustrate another examples of a display screen on which color code is output according to an embodiment.
Figure 4C:
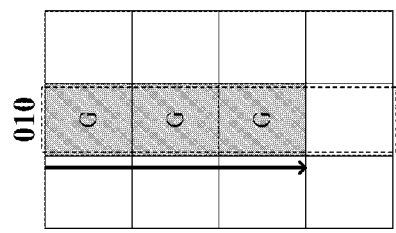
Figure 4B:
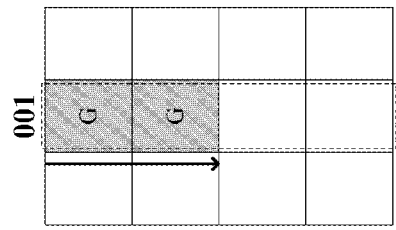
Figure 4A:
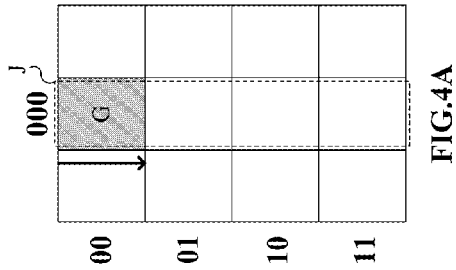
Figure 4H:
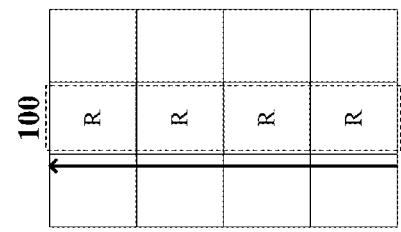
Figure 4G:
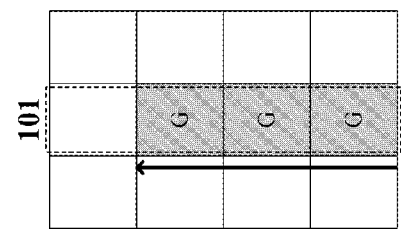
Figure 4F:
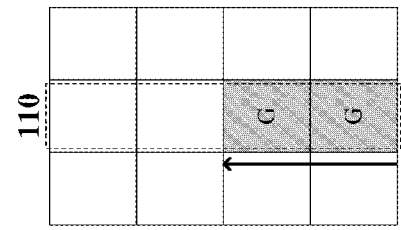
Figure 4E:
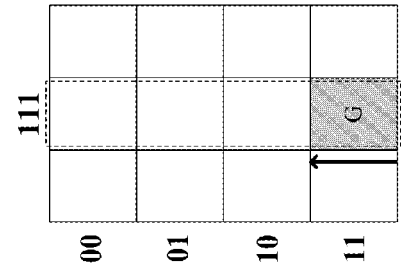

FIGS. 4A to 4H illustrate examples of a display screen on which color code is output. FIGS. 4A to 4H illustrate examples in which a specific color is output to the code section J of FIG. 2A. FIGS. 4A to 4H illustrate examples in which certain bits are represented in the same method as that applied to FIG. 3. A transmitter outputs green color (indicated by 'G') to the code section J. The outputting of the green color G to the display screen in FIGS. 4A to 4H is only an example. FIG. 4A to 4D illustrate examples in which '0' is added to the front of reference binary bits when a color is output to consecutive sections in the forward direction. FIG. 4A illustrates '000'. FIG. 4B illustrates '001'. FIG. 4C illustrates '010'. FIG. 4D illustrates '011'. FIG. 4E to 4H illustrate examples in which '1' is added to the front of the reference binary bits when the color is output to the consecutive sections in the backward direction. FIG. 4E illustrates '111'. FIG. 4F illustrates '110'. FIG. 4G illustrates '101'. Lastly, FIG. 4H illustrates an example in which a color other than the green color G is output to distinguish an output direction from that of FIG. 4D. FIG. 4H illustrates an example in which red color (indicated by 'R') is displayed, and illustrates '100'.

A color to be output from a code section may be determined in consideration of a color output from a code section adjacent thereto. This is because when the same color is output from adjacent code sections, color codes respectively output from these code sections may not be clearly distinguished from each other. Thus, different colors may be output from the adjacent code sections. For example, in FIGS. 3A to 4H, the code sections I and J are adjacent to each other. A color to be output from the code section J may be determined on the basis of Table 1 below. Table 1 below shows one example of a condition under which different colors should be output from adjacent code sections. When two or more code sections are adjacent to a specific code section, colors output from all the adjacent code sections may be taken into account.

TABLE 1

|   | Condition | Output color of FIG. 3 (i.e. Row I) | Output color of FIG. 4 (i.e. Row J) |
|---|---|---|---|
| 1 | When both of the code section I of FIG. 3 and the code section J of FIG. 4 are not '100' | Red (R) | Green (G) |
| 2 | When the code section I of FIG. 3 is not '100' and the code section J of FIG. 4 is '100' | Red (R) | Blue (B) |
| 3 | When the code section I of FIG. 3 is '100' and the code section J of FIG. 4 is not '100' | Blue (B) | Green (G) |
| 4 | When both of the code section I of FIG. 3 and the code section J of FIG. 4 are '100' | Blue (B) | Red (R) |

FIGS. 5A to 5H illustrates other examples of a display screen on which color code is output. FIGS. 5A to 5H illustrate examples in which a specific color is output to the code section K of FIG. 2A. In the code section K of FIGS. 5A to 5H, three-digit binary bits may be represented in the same method as those applied to FIGS. 3A through 4H.

In general, data represented in a computer device has a form of 8 bits, 16 bits, or the like. Thus, it is assumed that the code section K represents two-digit bits to represent 8 bits with three code sections I, J, and K output to one screen. The code section K of FIGS. 5A through 5H represents two-digit bits. FIG. 5A through 5H illustrate examples in which blue color (indicated by 'B') is output to subsections. As described above, a color which is different from the color output to the code section J may be output to the code section K adjacent to the code section J. Furthermore, different colors may be output to a plurality of code sections included in one screen.

FIG. 5A to D illustrate type 1. FIG. 5E to H illustrate type 2. FIG. 5A illustrates '00', in which all sub-sections of the code sections K are output in the backward direction. FIG. 5B illustrates '01', in which the first to third sub-sections of the code sections K are output in the backward direction. FIG. 5C illustrates '10', in which the first and second sub-sections of the code sections K are output in the backward direction. FIG. 5D illustrates '11', in which the first sub-section of the code sections K is output in the backward direction. FIG. 5E illustrates '00', in which the first sub-section of the code sections K is output in the forward direction. FIG. 5F illustrates '01', in which the first and second sub-sections of the code sections K are output in the forward direction. FIG. 5G illustrates '10', in which the first to third sub-sections of the code sections K are output in the forward direction. FIG. 5H illustrates '11', in which all sub-sections of the code sections K are output. However, two-digit bits may be represented in various methods other than the method applied to FIGS. 5A through 5H.

Furthermore, a color may be used as a criterion for determining additional bits. For example, it may be defined beforehand that a binary bit should be added to the front of reference binary bits when red color is output, and be added to the end of the reference binary bits when blue color is output. However, embodiments are not limited thereto and may be varied.

FIGS. 6A through 6H illustrate example of a display screen on which binary code corresponding to text data is output using the color code. Referring to FIG. 6A through 6H, 8 bits (=3 bits+3 bits+2 bits) are represented by outputting a color to a code region divided into three columns as described above with reference to FIGS. 3A to 5H. FIGS. 6A through 6H illustrate an example in which text data 'hello' is output as ASCII code.

FIG. 6A illustrates an example in which start code indicating the start of transfer of source data is output to the display screen before color code corresponding to the source data is transferred. FIG. 6H illustrates an example in which end code indicating the end of transfer of data is output to the display screen at a point of time when the transfer of the source data ends. The start code of FIG. 6A and the end code of FIG. 6H are only examples, and colors and patterns may be varied. A receiver starts decoding when it recognizes the start code, and ends the decoding when it recognizes the end code.

Referring to FIG. 6B, color code elements respectively representing '011/010/00' are output to a code group region divided into three columns. The '011/010/00' is ASCII code corresponding to character 'h'. Similarly, referring to FIG. 6C, '011/001/01' corresponding to character 'e' is output. Referring to FIG. 6D, '011/011/00' corresponding to character 'l' is output. Referring to FIG. 6E, '011/011/00' corresponding to character 'l' is output. Referring to FIG. 6F, '011/011/11' corresponding to character 'o' is output. FIGS. 6B through 6F illustrate examples in which one character is transferred to one screen.

FIG. 6G illustrates an example in which an afterimage removing screen is output during the transfer of the source data. Basically, color code outputs a specific color and thus an afterimage of a previous frame may remain on the display screen. Thus, the afterimage removing screen illustrated in FIG. 6G may be output at regular time intervals or intervals of frames. Black color may be output as the afterimage removing screen.

Figure 7:
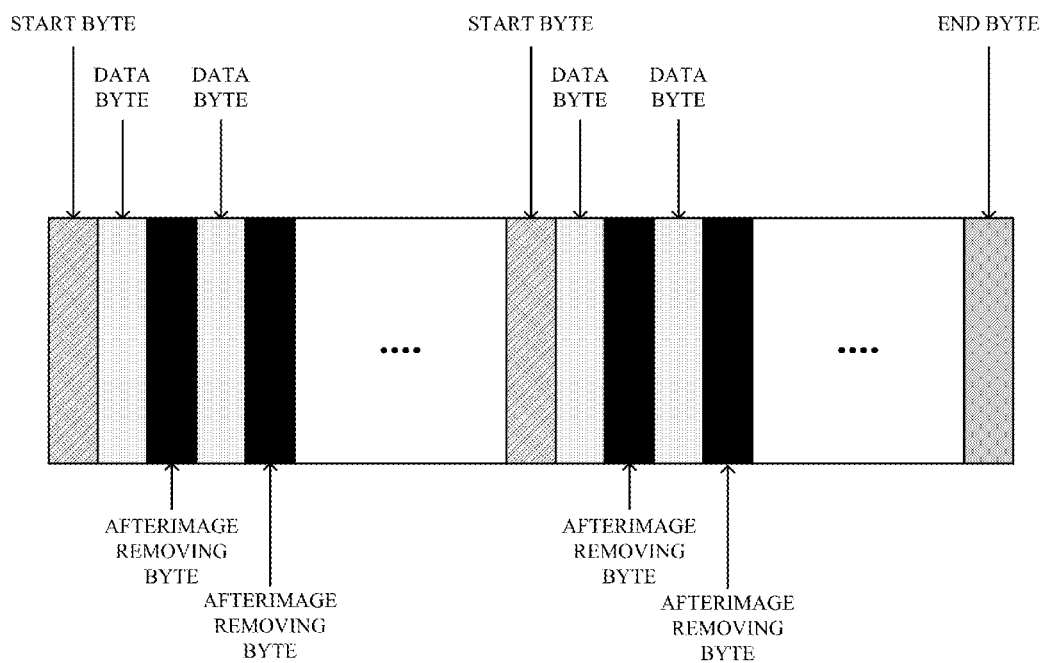
FIG. 7 illustrates an example of a frame structure in which color code is transferred according to an embodiment.

FIG. 7 illustrates an example of a frame structure in which color code is transferred. The color code may include a region (start byte) indicating the start of the color code, and a region (end byte) indicating the end of the color code. The start byte may correspond to the start code of FIG. 6A. The end byte may correspond to the end code of FIG. 6H. In FIG. 7, a data byte means a region representing source data.

In a display device, a color pattern is transferred using emission of light from a liquid crystal and thus an afterimage of a pattern transferred in a previous frame may remain according to a feature of the liquid crystal. An afterimage removing byte may cause a display panel to display black color. The afterimage removing byte corresponds to the afterimage removing screen described above. For example, in order to transfer text, a start byte is transferred, and the afterimage removing byte may be transferred between transfer of an 8-bit character and transfer of a subsequent 8-bit character.

As described above with reference to FIGS. 6A through 6H, a transmitter may output a black frame (the afterimage removing byte) between frames in which the source data is transferred for a certain time period at regular time intervals. Alternatively, the transmitter may not transfer any image between the frames in which the source data is transferred for the certain time period at the regular time intervals.

Figure 8:
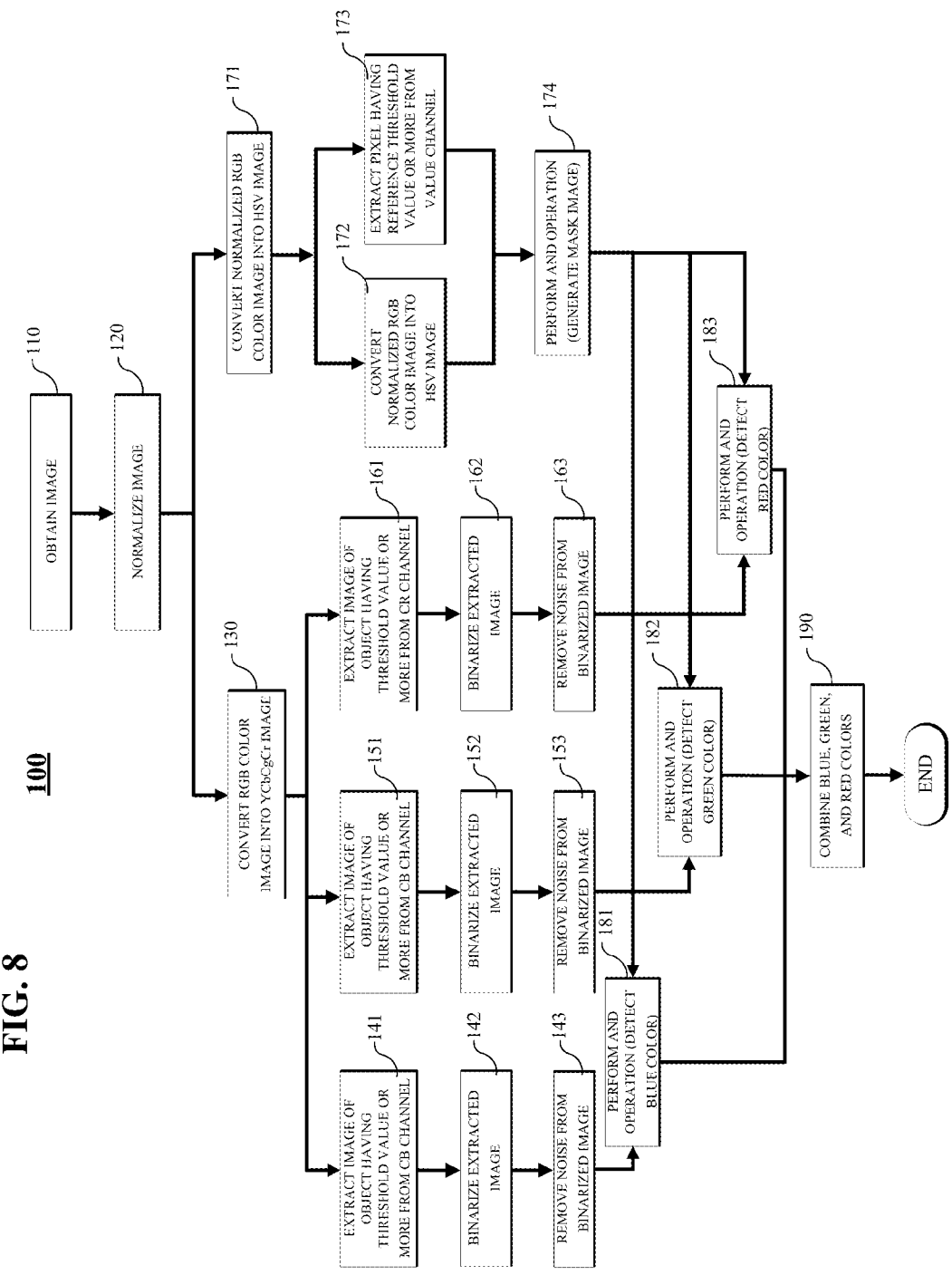
FIG. 8 is a flowchart illustrating an example of extracting color code by a receiver according to an embodiment.

FIG. 8 is a flowchart illustrating an example of extracting color code by a receiver. The receiver obtains an image displayed on a display screen of a transmitter through a camera (110). The receiver normalizes the obtained image (120). A color image input to the camera includes an RGB model. A general RGB color model is sensitive to a change in the intensity of illumination and thus an operation is difficult to be exactly performed thereon. Normalization may be performed to divide values of components r, g, and b by the sum of the values. The normalization may be calculated by Equation 1 below.

$$R = \frac{r}{(r+g+b)}, G = \frac{g}{(r+g+b)}, B = \frac{b}{(r+g+b)} \quad [\text{Equation 1}]$$

YCbCgCr color model conversion and HSV color model conversion are individually performed on the normalized image.

First, the YCbCgCr color model conversion will be described below. The receiver converts the normalized RGB color image into an YCbCgCr image (130). A process of extracting chrominance information Cb, Cg and Cr regarding B (blue), G (green) and R (red) components except a luminance component Y from an RGB color model may be performed using Equations 2 to 4 below. In Equations 2 to 4 below, R, G, and B respectively represent the values of the R (red), G (green), and B (blue) components obtained by normalizing the RGB color model.

$$Cb=0.16874 \times R-0.33126 \times G+0.50000 \times B \quad [\text{Equation 2}]$$

$$Cg=G-(B+((R-B)>>1)) \quad [\text{Equation 3}]$$

$$Cr=0.50000 \times R-0.41869 \times G-0.08131 \times B \quad [\text{Equation 4}]$$

Thereafter, the receiver extracts a region having a threshold value or more from each color channel. During this process, pixels having a predetermined threshold value or more (dark pixels) are extracted from chrominance channels of the respective chrominance information Cb, Cg and Cr. Setting of the threshold value may vary according to various environmental variables, such as system performance, information of an image of an object to be detected, the intensity of luminance at which an image is obtained, etc. Alternatively, the threshold value may vary according to a chrominance channel. For example, the receiver extracts an object having a specific threshold value or more from a blue color channel (141), binarizes the extracted image (142), and removes noise from the binarized image (143). Similarly, the receiver extracts an object having the specific threshold value or more from a green color channel (151), binarizes the extracted image (152), and removes noise from the binarized image (153). Lastly, the receiver extracts an object having the specific threshold value or more from a red color channel (161), binarizes the extracted image (162), and removes noise from the binarized image (163).

The receiver performs binarization on each chrominance channel (142, 152 and 162) so that an object having a corresponding color may be simplified to increase the efficiency of detecting the object. The binarization may be performed using Equation 5 below.

$$\text{Region of Object} = \begin{Bmatrix} 255 & \text{If}(\alpha \geq Cb, Cg, Cr) \\ 0 & \text{Otherwise} \end{Bmatrix} \quad [\text{Equation 5}]$$

Here, Region of Object denotes a region of an image, in which a specific object is provided, and α denotes a threshold value for binarization. That is, the region of the image Region of Object has a value of 255 (black color) when chrominance information extracted with respect to each of the respective chrominance information Cb, Cg and Cr is greater than or equal to the threshold value α, and has a value of 0 (white color) when the chrominance information extracted with respect to each of the respective chrominance information Cb, Cg and Cr is less than the threshold value α.

After binarization is performed, operations 143, 153 and 163 may be performed to remove unnecessary objects, noise, etc. so as to more exactly detect an object region of interest. For example, noise may be removed by performing dilation using Equation 6 below and performing erosion using Equation 7 below.

$$A \oplus B = \bigcup_{w \in B} A_w = (a, b) + (u, v) : (a, b) \in A, (u, v) \in B \quad [\text{Equation 6}]$$

In dilation, when it is assumed that A and B represent sets of pixels, A⊕B may be defined by Equation 6 above. Erosion is performed to mainly decrease protrusions inside an object and increase protrusions outside the object, so that a space (such as a hole) generated in the object or a background may be filled or shortly cut regions may be connected. Erosion is performed on a region of a binary image in which black and white pixels are present together rather than a region of the binary image in which input pixels are uniform.

$$A \ominus B = w : B_w \subseteq A \quad [\text{Equation 7}]$$

In erosion, when it is assumed that A and B are sets of pixels, A⊖B may be defined by Equation 7 above. Here, $B_w$ represents a result of erosion occurring in a set w=(u, v) entirely included in the set of pixels A, included in a result of moving a morpheme B. That is, dilation may be defined as a set of points corresponding to origins on places (in which the set of pixels B may be entirely included) detected while moving the set of pixels B above the set of pixels A.

The HSV color model conversion will now be described below. The receiver converts the normalized RGB color image into an HSV image (operation S171).

The receiver extracts a pixel having a first threshold value or more and a pixel having a second threshold value or less from a saturation (S) channel of the HSV image (operation 172), and extracts a pixel having a reference threshold value or more from a value (V) channel (operation 173). The receiver performs an AND operation to combine an image extracted from the S channel and an image extracted from the V channel, thereby generating a mask image (operation 174).

The receiver synthesizes the result extracted from each channel during the YCbCgCr color model conversion with the mask image. The receiver detects blue color by performing the AND operation on a noise-removed image from a Cb channel and the mask image (181), detects green color by performing the AND operation on a noise-removed image from a Cg channel with the mask image (182), and detects red color by performing the AND operation on a noise-removed image from a Cr channel with the mask image (183). Finally, the receiver combines the blue, green, and red colors to generate a final image (190). Then, the receiver decodes data on the basis of the final image.

Figure 9A:
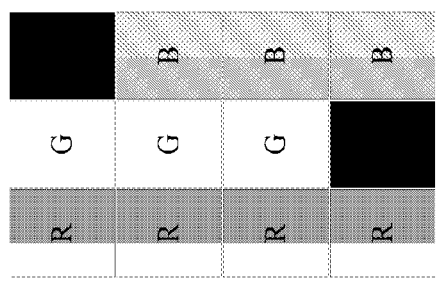
FIGS. 9A through 9E illustrate examples of extracting a region which outputs color code by a receiver according to an embodiment.
Figure 9B:
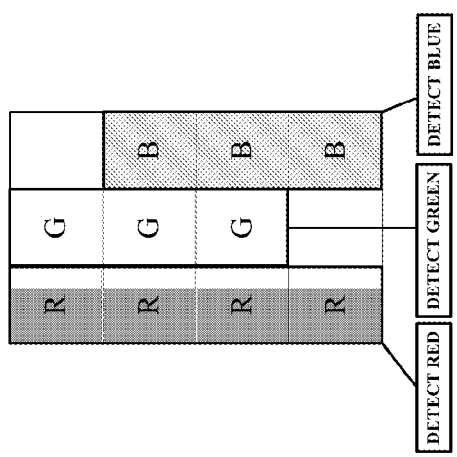

The receiver obtains an image including a display screen of a transmitter through a camera. The receiver extracts a region outputting color code from the obtained image. FIGS. 9A through 9E illustrates examples of extracting a region which outputs color code by a receiver. FIG. 9A illustrates an example of an image output from the display screen of the transmitter. The receiver detects a region of the obtained image that outputs specific colors (red, blue, and green colors in FIG. 9) as illustrated in FIG. 9B. The receiver may detect the region of the image having the specific colors by analyzing color components of the obtained image.

Figure 9C:
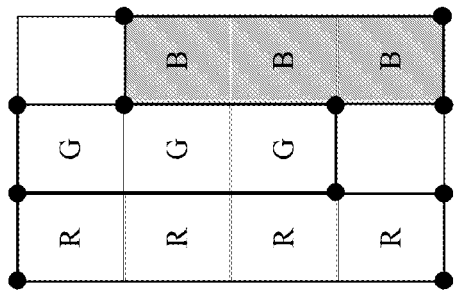
Figure 9D:
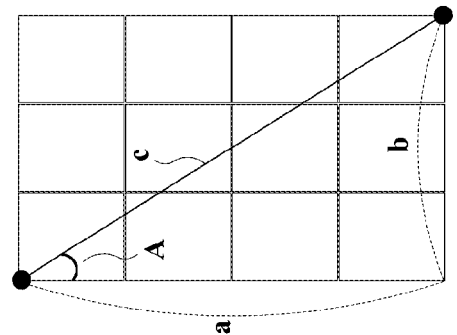
Figure 9E:
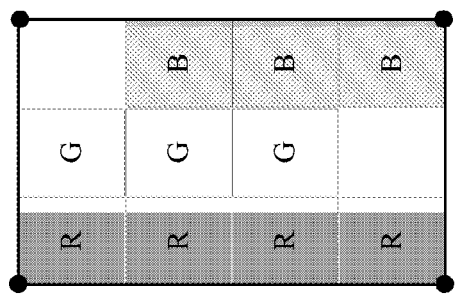

The receiver may detect the region having the specific colors and define the region outputting the specific colors as illustrated in FIG. 9C. When code sections have a tetragonal shape, the receiver may extract coordinates representing four corners as illustrated in FIG. 9C. The receiver may detect an entire region using the extracted coordinates. The receiver may extract a length c of a diagonal line using upper left coordinates and lower right coordinates as illustrated in FIG. 9D. When the extracted length c of the diagonal line and an included angle A are determined, the receiver may calculate the lengths of the sides (the height a and the bottom side b) of a right-angled triangle using a trigonometric ratio. Equation 8 below may be used to calculate the lengths of the height a and the bottom side b.

$$a = c \sin A$$
$$b = c \cos A \quad \text{[Equation 8]}$$

The following condition may be set so that the receiver may detect a whole region outputting color code according to the method described above with reference to FIGS. 9A through 9E. It is assumed that color code is output from a code section as described above with reference to FIGS. 3A to 5H. In the code section I of FIGS. 3A through 3D, when a color is output in the forward direction or from top to bottom (i.e., when an additional bit is '0'), the color code is output from the code section K of FIGS. 5A through 5D according to type 1. In contrast, in the code section I of FIGS. 3E through H, when a color is output in the backward direction, or from bottom to top (i.e., when the additional bit is '1'), the color code is output from the code section K of FIGS. 5E through H according to type 2. In this case, the receiver may extract the whole region outputting the color code using upper left coordinates and lower right coordinates of this region.

Figure 10:
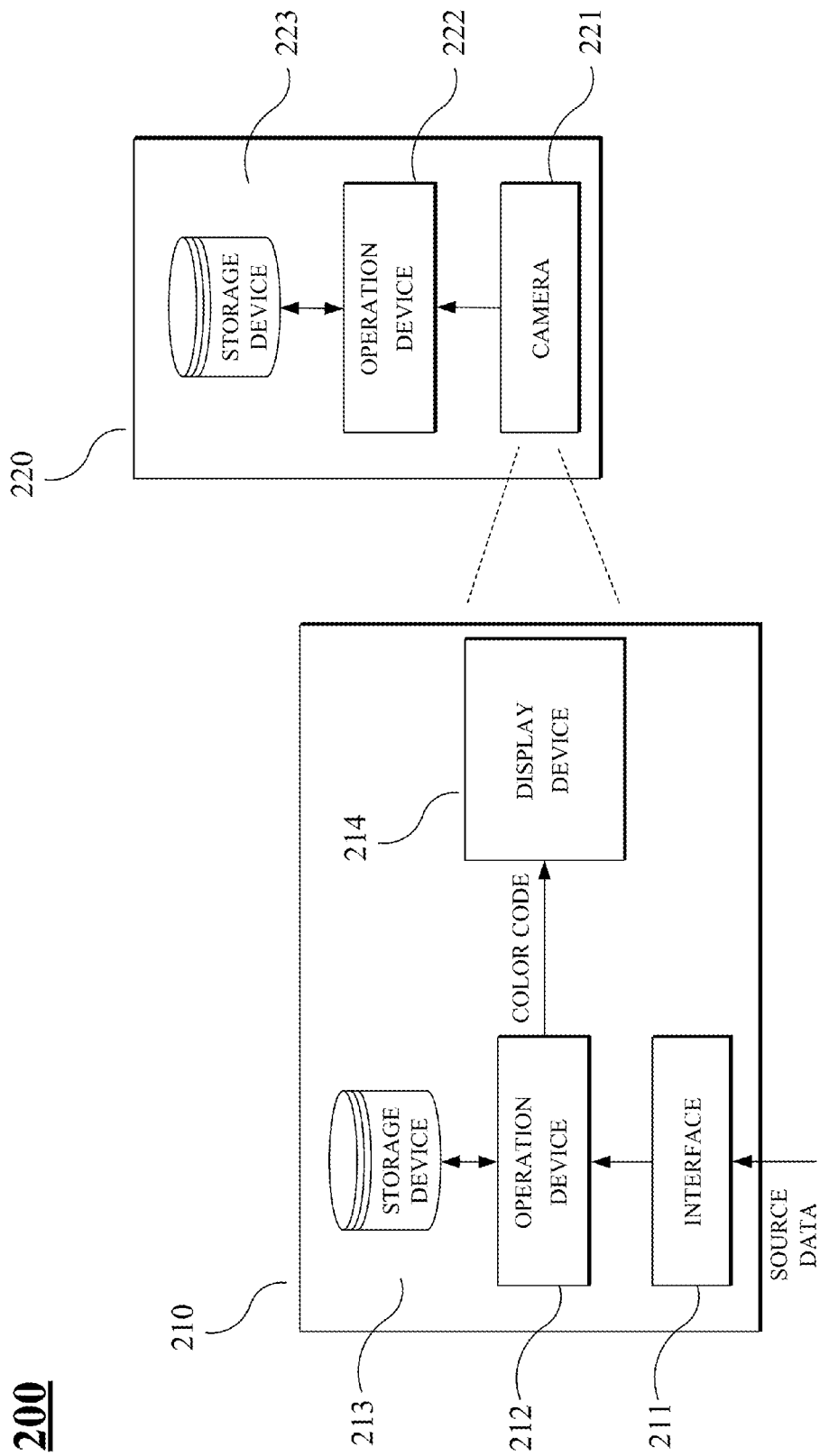
FIG. 10 is a block diagram illustrating an example of a system which transfers data using color code according to an embodiment.

FIG. 10 is a block diagram illustrating an example of a system which transfers data using color code. The system 200 which transfers data using color code includes a transmitter 210 which outputs color code to a display screen thereof, and a receiver 220 which obtains the color code output from the transmitter using a camera and decodes the color code.

The transmitter 210 includes an interface 211, an operation device 212, a storage device 213, and a display device 214.

The transmitter 210 generates source data in the form of certain binary code according to a data standard or another condition. The source data may be input via the interface 211 of the transmitter 210. The interface 211 is an input tool through which the source data is input, or is configured to receive the source data from a storage medium storing the source data. Examples of the input tool include a keyboard, a mouse, a touch panel, a microphone for voice recognition, etc. Examples of the storage medium include a hard disk, a solid state drive (SSD), a universal serial bus (USB), a security digital (SD) memory card, or memory. Furthermore, the interface 211 may be configured to receive data from the outside through a network.

The operation device 212 determines color code corresponding to the source data. The operation device 212 may be a central processing unit (CPU), an application processor (AP), a processor or other computer device which performs a certain operation. The operation device 212 refers to a code table stored in the storage device 213 so as to generate the color code corresponding to the source data. The storage device 213 may be a random access memory (RAM), a flash memory, a hard disk, or other memory. For example, the code table may store ASCII code representing text data, and specific color code corresponding to binary code making up the ASCII code.

The operation device 212 divides the binary code by a unit length (e.g., three bits) that may be represented by each color code element. The operation device 212 converts the binary code divided by the unit length into certain color code by referring to the code table.

The operation device 212 may temporarily store the color code in the storage device 213. The display device 214 outputs the color code. Color code received by the display device 214 corresponds to a command that instructs a color to be output to a specific location (code section) on the display screen.

The receiver 220 includes a camera 221, an operation device 222, and a storage device 223. The camera 221 may be included in the receiver 220 or may be an external device connected to the receiver 220.

The camera 221 captures a screen displayed on the display device 214 that outputs the color code. The operation device 222 extracts the color code by analyzing an image obtained through the camera 221. The operation device 222 decodes the color code using a decoding table stored in the storage device 223. The operation device 222 distinguishes the extracted color code in units of code sections, and determines binary bits represented by each of the code sections by referring to the decoding table. The operation device 222 generates a binary bit string representing the source data by combining the binary bits represented by the code sections. For example, the operation device 222 may generate an 8-bit binary string by combining three bits, three bits, and two bits. The operation device 222 may decode the 8-bit binary code into text data using an ASCII code table.

The operation device 222 may be a central processing unit (CPU), an application processor (AP), a processor or other computer device which performs a certain operation. The operation device 222 refers to a code table stored in the storage device 223 so as to decode the color code corresponding to the received data. The storage device 223 may be a random access memory (RAM), a flash memory, a hard disk, or other memory. For example, the code table may store ASCII code representing text data, and specific color code corresponding to binary code making up the ASCII code.

Figure 11:
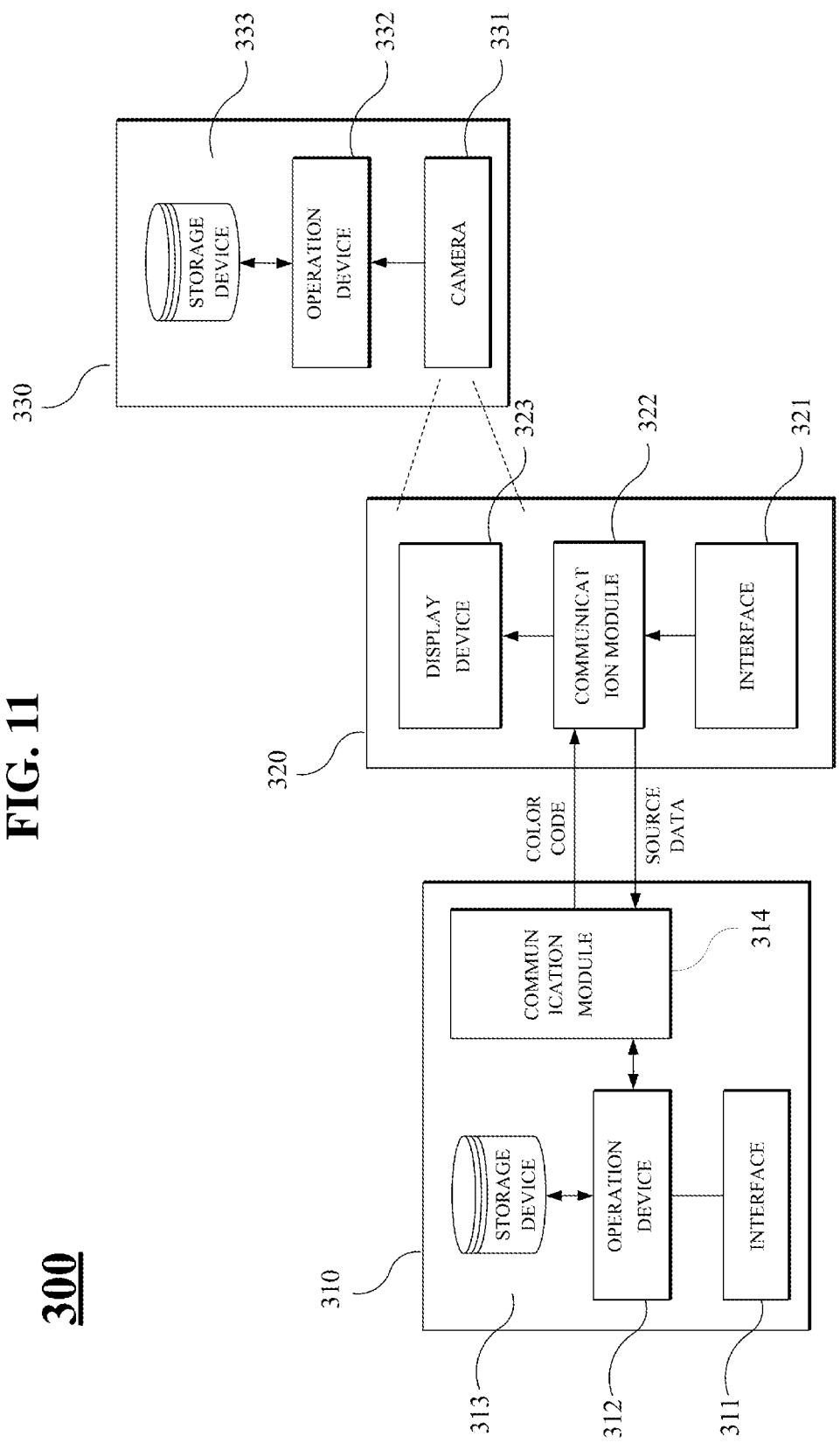
FIG. 11 is a block diagram illustrating another example of a system which transfers data using color code according to an embodiment.

FIG. 11 is a block diagram illustrating an example of a system which transfers data using color code. In the system 300 which transfers data using color code, a device which generates color code and a device which outputs the color code are separately configured. The system 300 which transfers data using color code includes a server 310 which generates color code corresponding to source data, a transmitter 320 which outputs the color code, and a receiver 330 which decodes the color code.

The server 310 includes an interface 311, an operation device 312, a storage device 313, and a communication module 314. The interface 311 is configured to receive the source data. The interface 311 is an input tool through which the source data is input, or is configured to receive the source data from a storage medium storing the source data. Examples of the input tool include a keyboard, a mouse, a touch panel, a microphone for voice recognition, etc. Examples of the storage medium include a hard disk, an SSD, a USB, an SD memory card, etc.

The operation device 312 determines color code corresponding to the source data. The operation device 312 is a device of a computer device, such as a processor, which performs a certain operation. The operation device 312 refers to a code table stored in the storage device 313 so as to generate the color code corresponding to the source data. The storage device 313 may be a RAM, a flash memory, a hard disk, or other memory. For example, the code table may store ASCII code representing text data, and specific color code corresponding to binary code making up the ASCII code.

The communication module 314 is a device which transfers the color code to the transmitter 320. The communication module 314 supports at least one among various communication methods such as near-field communication, the Internet or mobile telecommunication. The source data may also be transferred from the transmitter 320. In this case, the communication module 314 receives the source data.

The transmitter 320 includes an interface 321, a communication module 322, and a display device 323.

The source data may be input via the interface 321 of the transmitter 320. The interface 321 is an input tool through which the source data is input, or is configured to receive the source data from a storage medium storing the source data. Examples of the input tool include a keyboard, a mouse, a touch panel, or a microphone for voice recognition. Examples of the storage medium include a hard disk, an SSD, a USB, an SD memory card, or a memory. Furthermore, the interface 321 may be configured to receive data from the outside through a network.

The communication module 322 transfers the source data to the server 310. The communication module 322 receives the color code from the server 310. The display device 323 outputs the received color code. The color code received by the transmitter 320 may include a command that instructs a color to be output to a specific location (e.g., a code section) on the display screen.

The receiver 330 includes a camera 331, an operation device 332, and a storage device 333. The camera 331 may be included in the receiver 330 or may be an external device connected to the receiver 330.

The camera 331 captures a screen displayed on the display device 214 which outputs the color code. The operation device 332 extracts the color code by analyzing an image obtained through the camera 331. The operation device 332 decodes the color code using a decoding table stored in the storage device 333. The operation device 332 distinguishes the extracted color code in units of code sections, and determines binary bits represented by each of the code sections by referring to the decoding table. The operation device 332 generates a binary bit string representing the source data by combining the binary bits represented by the code sections. For example, the operation device 332 may generate an 8-bit binary string by combining three bits, three bits, and two bits. The operation device 332 may decode the 8-bit binary code into text data using an ASCII code table.

Furthermore, the receiver 330 may detect screens output from a plurality of transmitters 320. In this case, n:1 communication may be established.

Figure 12:
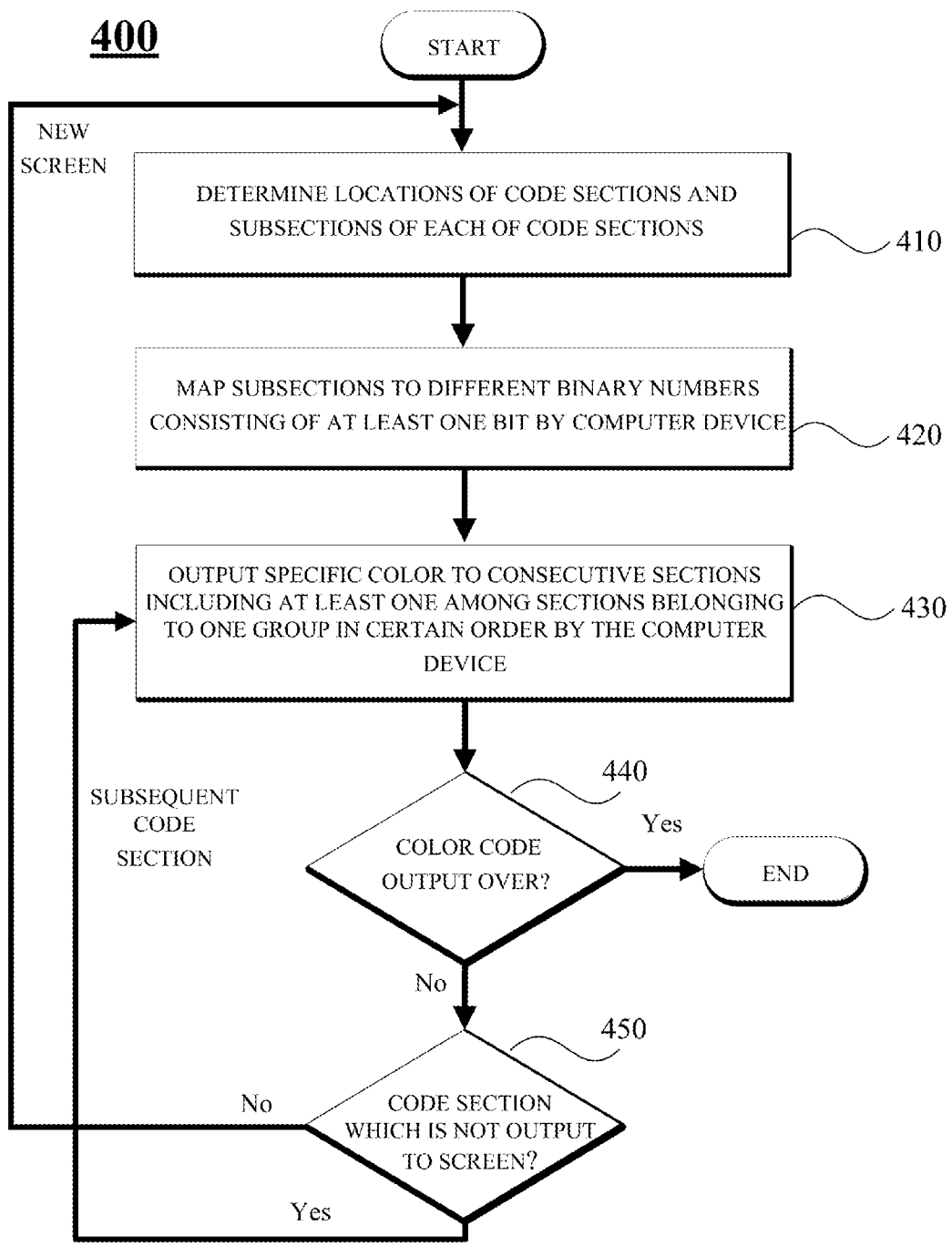
FIG. 12 is a flowchart illustrating an example of a method of outputting color code for data communication according to an embodiment.

FIG. 12 is a flowchart illustrating an example of a method of outputting color code for data communication 400. FIG. 12 illustrates a method of outputting color code by a transmitter. In FIG. 12, a computer device may correspond to the transmitter described above.

As illustrated in FIGS. 2A through 2D, one display screen may include a plurality of code sections. The computer device determines a location of each of the code sections and locations of subsections making up each of the code sections (410). The computer device maps the plurality of subsections to different binary numbers consisting of at least one bit (reference binary bits as described above) (420).

The computer device outputs a specific color to consecutive sections including at least one among a plurality of sections belonging to one group in a certain order (430). This process should be understood as a process of outputting color code to one code section by the computer device.

The computer device determines whether output of color code corresponding to source data is over or completed (440). When the color code is completely output, the outputting of the color code is ended.

When the color code is not completely output, the computer device determines whether there is a code section which is not output to a current screen (450). That is, when there is a code section of the display screen to which color code is not output, the color code is output to a subsequent code section in a certain order. If the color code is output to all current code sections of the display screen, the process of outputting the color code is performed again in a new frame.

Figure 13:
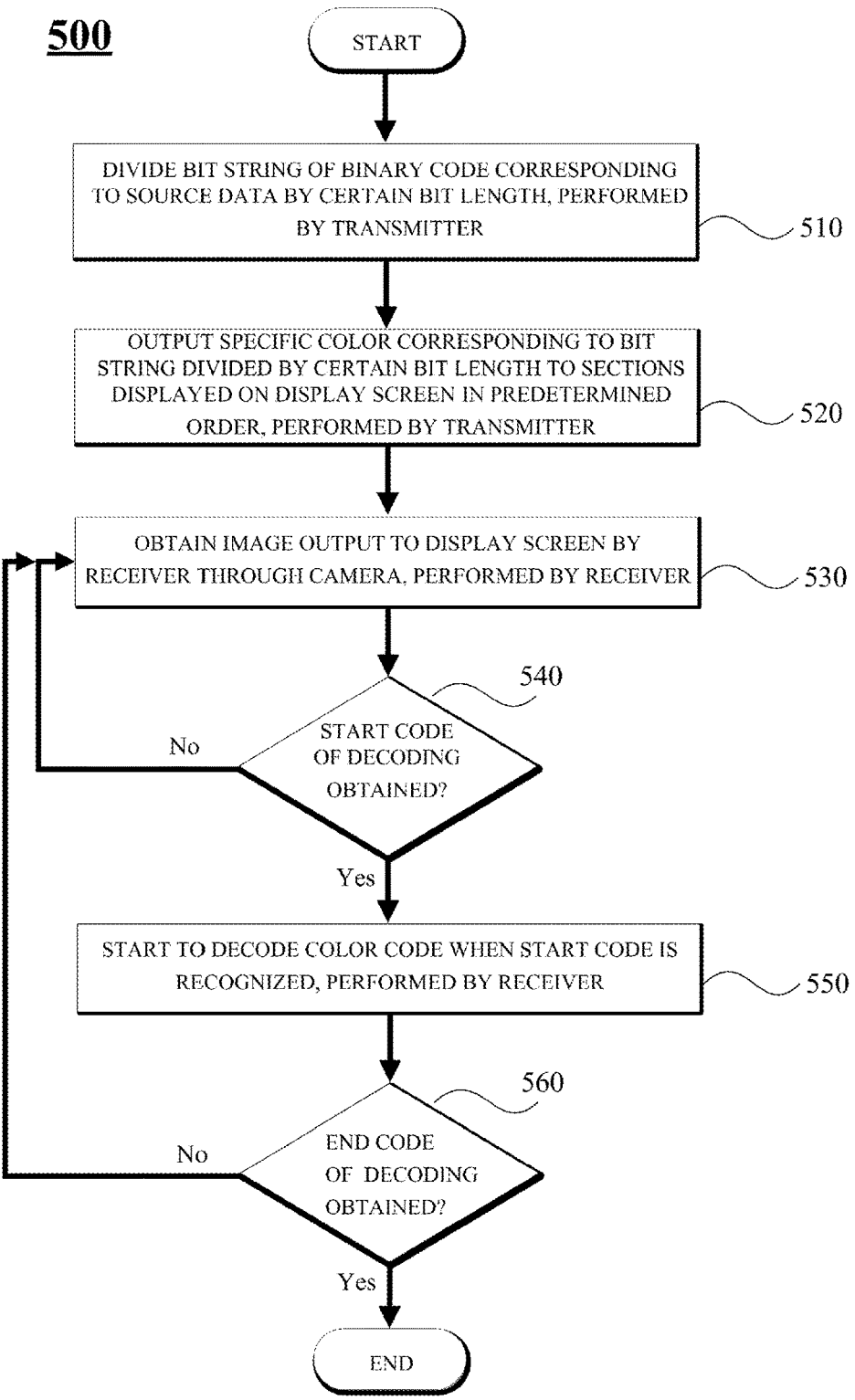
FIG. 13 is a flowchart illustrating an example of a method of transferring data using color code according to an embodiment.

FIG. 13 is a flowchart illustrating an example of a method of transferring data using color code 500 according to an embodiment. A transmitter divides a bit string of binary code corresponding to source data by a certain bit length (510). In operation 510, the bit string of the binary code is divided by a bit length that may be represented by each code section.

The transmitter outputs a specific color corresponding to the bit string divided by the certain bit length to a plurality of sections of a display screen in a certain order (520). In operation 520, the transmitter consecutively outputs color code corresponding to the source data to the code sections of the display screen. When output of the color code is over in one frame, the transmitter continuously outputs, or maintains, the color code in a subsequent frame.

A receiver obtains an image including the color code output in one frame by the transmitter through a camera (530). The receiver may start code decoding after an image of all color codes output in a plurality of frames from the obtained or may start code decoding in units of frames obtained in real time. The receiver determines whether a start code indicating the start of a code decoding is included in the color codes contained in the image (540). When the start code is recognized, the receiver starts to decode the color codes (550). The receiver determines whether there is an end code indicating the end of code decoding among the color codes (560). The receiver ends the decoding of the color codes when it recognizes the end code.

When the receiver ends the decoding of the color codes normally, the receiver obtains the source data. Thus, the source data is transferred from the transmitter to the receiver. For example, the receiver may decode the source data, and perform user authentication by comparing the source data with authentication data that the receiver has.

As described above, the transmitter outputs color code via the display device thereof, and the receiver obtains an image including the color code through a camera. The image obtained through the camera is influenced by the intensity of illumination or an amount of exposure of a lens. For example, color code extracted by the receiver may not be color code that the transmitter desires to transmit when the intensity of illumination is too low or too high. Furthermore, it may be difficult for the receiver to extract a color code due to noise caused by an inappropriate intensity of illumination. Thus, the transmitter may output a color having an appropriate brightness value or a color of an appropriate type in consideration of ambient conditions.

Figure 14:
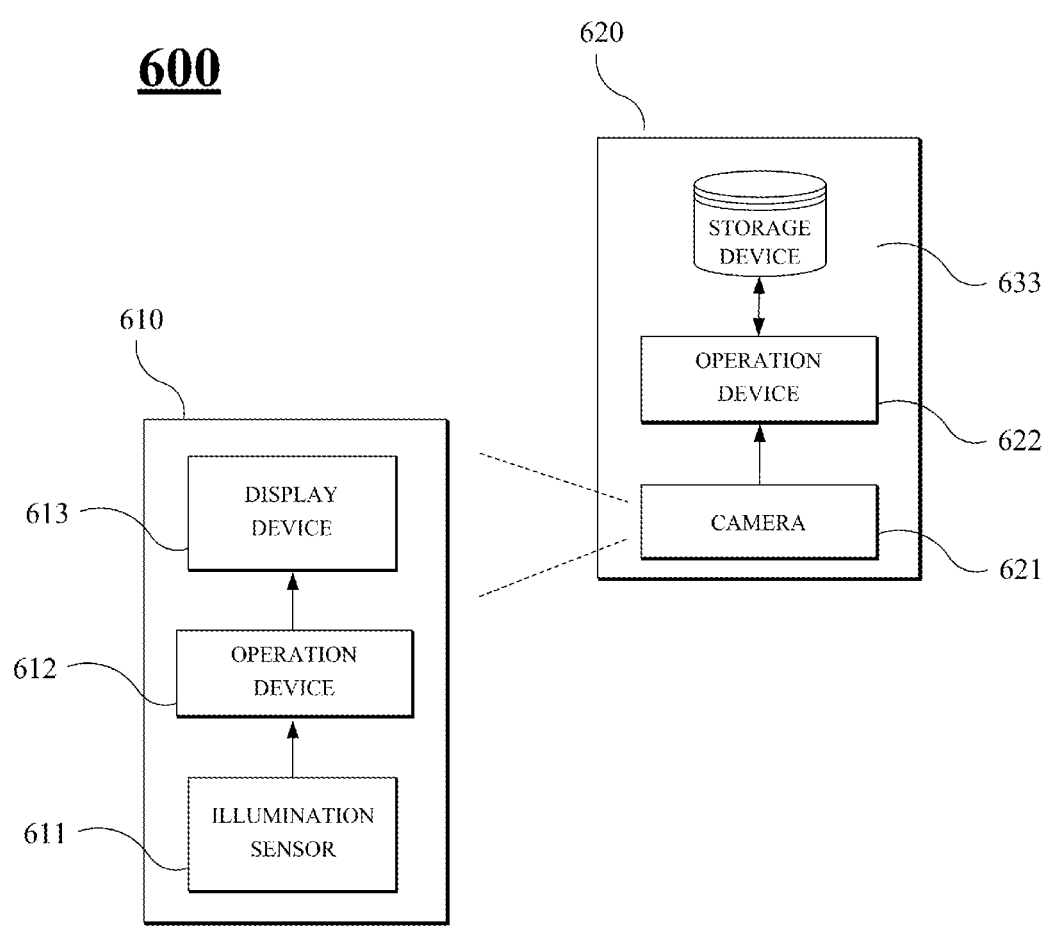
FIG. 14 is a block diagram illustrating another example of a system which transfers data using color code according to an embodiment.

FIG. 14 is a block diagram illustrating an example of a system which transfers data using color code according to an embodiment. The system 600 which transfers data using color code includes a transmitter 610 and a receiver 620. In FIG. 14, the transmitter 610 may include additional elements for generating a color code or receive a color code from a server. In FIG. 14, the transmitter 610 includes predetermined color codes stored in a memory.

The transmitter 610 includes an illumination sensor 611, an operation device 612, and a display device 613. The illumination sensor 611 measures an ambient illumination intensity. The operation device 612 may uniformly correct current color code based on the ambient illumination intensity measured by and received from the illumination sensor 611.

The operation device 612 checks whether the ambient illumination intensity is in a predetermined reference range. The predetermined reference range may be stored in an additional storage device or internal memory. The predetermined reference range may be a range based on which the receiver 620 may determine a color value of an image obtained through a camera 621 thereof to a color value that the transmitter 610 intended. The predetermined reference range may vary according to a brightness value of an output of the display device 613, a color value, and ambient conditions.

When the ambient illumination intensity is less than a lower limit of the predetermined reference range, the operation device 612 may deepen a color by decreasing a brightness value of the display device 613 or changing a value of at least one among red color, green color, and blue color among output colors. In contrast, when the ambient illumination intensity is greater than an upper limit of the predetermined reference range, the operation device 612 may lighten a color by increasing the brightness value of the display device 613 or changing a value of at least one among the red color, the green color, and the blue color among the output colors.

The operation device 612 uniformly corrects a brightness value of a color to be output or a value of a color on the basis of the difference between the ambient illumination intensity measured by the illumination sensor 611 and the lower or upper limit of the predetermined reference range. Alternatively, the display device 613 may control a brightness value of a display panel of the display device 613 to be proportional to this difference operation calculated by the operation device 612. The display device 613 may change a value of at least one of the red color, the green color, and the blue color such that a color to be output from the display panel becomes darker or brighter to be proportional to this difference.

The receiver 620 includes the camera 621, an operation device 622, and a storage device 633. The receiver 620 may correspond to the receiver 220 of FIG. 10 or the receiver 330 of FIG. 11, however, embodiments are not limited thereto.

Figure 15:
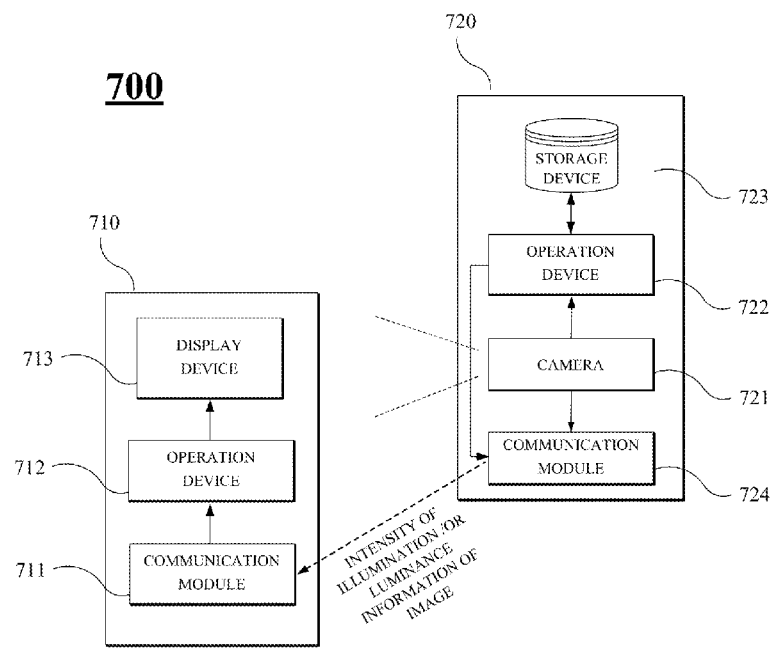
FIG. 15 is a block diagram illustrating yet another example of a system which transfers data using color code according to an embodiment.

FIG. 15 is a block diagram illustrating an example of a system which transfers data using color code according to an embodiment. The system 700 which transfers data using color code includes a transmitter 710 and a receiver 720. In the system 700 of FIG. 15, the receiver 720 transfers information regarding the intensity of illumination or a brightness value of an image to the transmitter 710.

The receiver 720 includes a camera 721, an operation device 722, a storage device 723, and a communication module 724. The receiver 720 directly measures the intensity of illumination and transfers information regarding the intensity of illumination to the transmitter 710, or analyzes a brightness value of an image and transfers information regarding the brightness value to the transmitter 710.

The camera 721 may measure the intensity of illumination using an illumination sensor. The camera 721 may include an illumination sensor and may measure the intensity of illumination. The receiver 720 may measure the intensity of illumination using an additional illumination sensor external to the camera 721.

Alternatively, the operation device 722 may analyze a brightness value of an image obtained by the camera 721. The operation device 722 may analyze whether a current image is generally bright or dark on the basis of brightness values of pixels making up an image. For example, the operation device 722 may determine a whole brightness value of the image on the basis of brightness values of all pixels constituting, or making up, one frame or an average of the brightness values. The operation device 722 may differently determine a brightness value of an image according to a color model (RGB, YCbCr, or the like) representing an image. For example, the operation device 722 may determine a brightness value of a background. An average of all brightness values of the background may be used as the brightness value of the background. Various methods may be used to determine a brightness value of an image. The operation device 722 may convert an RGB image into a color space representing a luminance component Y such as YCbCr, and calculate an average brightness value of the luminance component Y.

The communication module 724 transfers information regarding a measured intensity of illumination or information regarding a brightness value of an image to the transmitter 710. The communication module 724 may transfer the information using a method such as near-field communication, Wi-Fi, or mobile telecommunication, as only examples.

The transmitter 710 includes a communication module 711, an operation device 712, and a display device 713. In FIG. 15, the transmitter 710 may include additional elements which generate color code or receive color code from a server. In FIG. 15, it is assumed that the transmitter 710 includes predetermined color codes stored on a memory.

The communication module 711 receives information regarding the intensity of illumination or a brightness value of an image from the receiver 720. The operation device 712 checks whether the intensity of illumination or the brightness value of the image is within a predetermined reference range. The predetermined reference range may be stored in an additional storage device. The predetermined reference range should be understood as a range based on which the receiver 720 may determine a color value of an image obtained through the camera 721 to be a color value that the transmitter 710 intended. The predetermined reference range may vary according to a brightness value of an output of the display device 713, a color value, and ambient conditions.

When the intensity of illumination or the brightness value of the image is less than a lower limit of the predetermined reference range, the operation device 712 may deepen a color by decreasing a brightness value of the display device 713 or changing a value of at least one among red color, green color, and blue color among output colors. In contrast, when the intensity of illumination or the brightness value of the image is greater than an upper limit of the predetermined reference range, the operation device 712 may lighten a color by increasing the brightness value of the display device 713 or changing a value of at least one among the red color, the green color, and the blue color among the output colors.

The operation device 712 uniformly corrects a brightness value of a color to be output or a value of a color on the basis of the difference between either the intensity of illumination or the brightness value of the image and the lower or upper limit of the predetermined reference range. Alternatively, the display device 713 may be a display panel and may control a brightness value of the display panel to be proportional to this difference calculated by the operation device 712. The display device 713 may change a value of at least one of the red color, the green color, and the blue color such that a color output from the display panel becomes darker or lighter to be proportional to this difference.

According to the technique described in the present examples, data is transferred by outputting color code having a specific pattern to a screen and capturing the screen. According to this technique, data can be transferred in an environment in which radio-frequency (RF) communication cannot be established, such as visible light communication.

The respective transmitters 210, 320, 610, and 710; receivers 220, 330, 620, and 720; operation devices 212, 222, 312, 332, 612, 622, 712, and 722; interfaces 211, 311, 321; display devices 214, 323; communication modules 314, 322, 711, and 724 in FIGS. 10, 11, 14 and 15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9E, 12, and 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of outputting, for data communication, color codes to a display screen, the method comprising:
   determining respective locations of a plurality of sections, each section divided in the display screen, wherein the respective locations of the plurality of sections each has a different binary code;
   generating the color codes, using a color code table for the data communication, by mapping a predetermined respective color to each of the plurality of sections corresponding to source data to be communicated; and
   outputting the predetermined respective color to the display screen.

2. The method of claim 1,
   wherein the determining of respective locations comprises determining locations having the binary codes corresponding to the source data to be communicated, and
   the outputting comprises, using the color code table and in a predetermined direction of the plurality of sections, outputting the corresponding colors to the determined locations of the plurality of sections having the binary codes corresponding to the source data to be communicated.

3. The method of claim 2,
   wherein at least one binary code includes information of the predetermined direction of the plurality of sections for the outputting.

4. The method of claim 3, wherein the source data is converted into the binary codes representing the source data, and
   wherein the corresponding colors to the determined locations of the plurality of sections are output to the display screen so as to represent a portion of the binary codes.

5. The method of claim 3, wherein a bit string, comprising the binary codes corresponding to the source data, is divided by a predetermined bit length, and the corresponding colors are output to the display screen so as to represent the binary codes included in the bit string in a unit of the predetermined bit length.

6. The method of claim 3,
   wherein the binary codes corresponding to the source data are represented consecutively in one or more of the plurality of sections in the display screen, and
   wherein, when the binary codes are represented consecutively in two or more of the plurality of sections including a first section and a second section adjacent to the first section, a color for the first section is different from a color for the second section.

7. The method of claim 3, wherein the binary codes are represented, in the direction including a first direction and a second direction, consecutively in two or more of the plurality of sections, and a color output in the first direction is different from color output in the second direction.

8. The method of claim 3, wherein the display screen is divided into the plurality of sections including a plurality of subsections, and different colors are output to the plurality of subsections.

9. A method of transferring data using color code, the method comprising:
   generating the color code, using a color code table, by mapping a predetermined respective color to each of a plurality of sections, each section being divided in a display screen and being mapped to binary codes;

dividing, by a bit length, a bit string comprising binary codes corresponding to source data to be communicated;

determining which of the plurality of sections includes mapped binary codes corresponding to the divided bit string for the source data; and outputting the predetermined respective color to the display screen.

10. The method of claim 9, further comprising:

outputting, by a transmitter using the color code table and in a predetermined direction of the plurality of sections, a predetermined color to a plurality of sections including the mapped binary codes corresponding to the divided bit string for the source data, wherein the predetermined color corresponds to the bit string divided by the bit length;

obtaining, by a receiver, an image output to the display screen through a camera; and decoding the source data contained in the image on the basis of the predetermined color output to the plurality of sections, using the color code table.

11. The method of claim 9, wherein a transmitter outputs a predetermined color to one of consecutive sections among a plurality of sections in a predetermined direction of the plurality of sections, and wherein at least one binary code includes information of the predetermined direction for outputting, by the transmitter using the color code table and in the predetermined direction.

12. The method of claim 11, wherein, when the consecutive sections include a first section and a second section adjacent to the first section, a color output in the first section is different from a color output in the second section.

13. The method of claim 11, wherein the transmitter outputs the predetermined color to the one of the consecutive sections in the direction of the plurality of sections, and outputs a different color to another of the consecutive sections in a reverse direction opposite to the direction of the plurality of sections.

14. The method of claim 11, wherein the transmitter divides the display screen into the plurality of sections respectively including a plurality of subsections, and outputs different colors to the plurality of subsections.

15. The method of claim 11, further comprising a receiver decoding the source data and performing user authentication by comparing pre-stored authentication data with the decoded source data.

16. The method of claim 11, further comprising outputting a start frame and an end frame respectively including a black color with a different color pattern to the display screen.

17. The method of claim 11, further comprising measuring an intensity of illumination, and control a brightness value or a color value of the predetermined color output to the consecutive sections when the measured intensity of illumination is outside a reference range.

18. The method of claim 11, further comprising:

measuring, by a receiver, intensity of illumination;

analyzing, by the receiver, a brightness value of an image obtained by the camera, and transferring, by the receiver, information regarding the intensity of illumination or the brightness value of the image to the transmitter through a network, wherein, when the intensity of illumination or the brightness value of the image is outside a reference range, the transmitter controls, using the transferred information, a brightness value or a color value of the predetermined color output to the consecutive sections.

19. A transmitter for data communication, comprising:

a display screen; and a processor configured to:

determine respective locations of a plurality of sections-, each section divided in the display screen;

map different binary codes to the locations of the plurality of sections, the binary codes having at least one-bit length, wherein corresponding colors to the determined locations of the plurality of sections are output to the display screen.

20. The transmitter of claim 19, wherein the processor is further configured to:

generate color codes, using a color code table for the data communication, by mapping a predetermined respective color to each of the plurality of sections;

determine locations, of the plurality of sections, having binary codes corresponding to source data to be communicated; and output, using the color code table for the data communication and in a predetermined direction of the plurality of sections, the corresponding colors to the determined locations of the plurality of sections having the binary codes corresponding to the source data, wherein at least one binary code includes information of the predetermined direction of the plurality of sections for the outputting.

* * * * *